June 30, 1953 A. J. WEISS 2,643,589
METHOD OF MAKING CARTONS AND CARTON BLANKS
Original Filed Sept. 20, 1945 4 Sheets-Sheet 1

INVENTOR.
ARTHUR J. WEISS
ATTORNEY

June 30, 1953 A. J. WEISS 2,643,589
METHOD OF MAKING CARTONS AND CARTON BLANKS
Original Filed Sept. 20, 1945 4 Sheets-Sheet 2
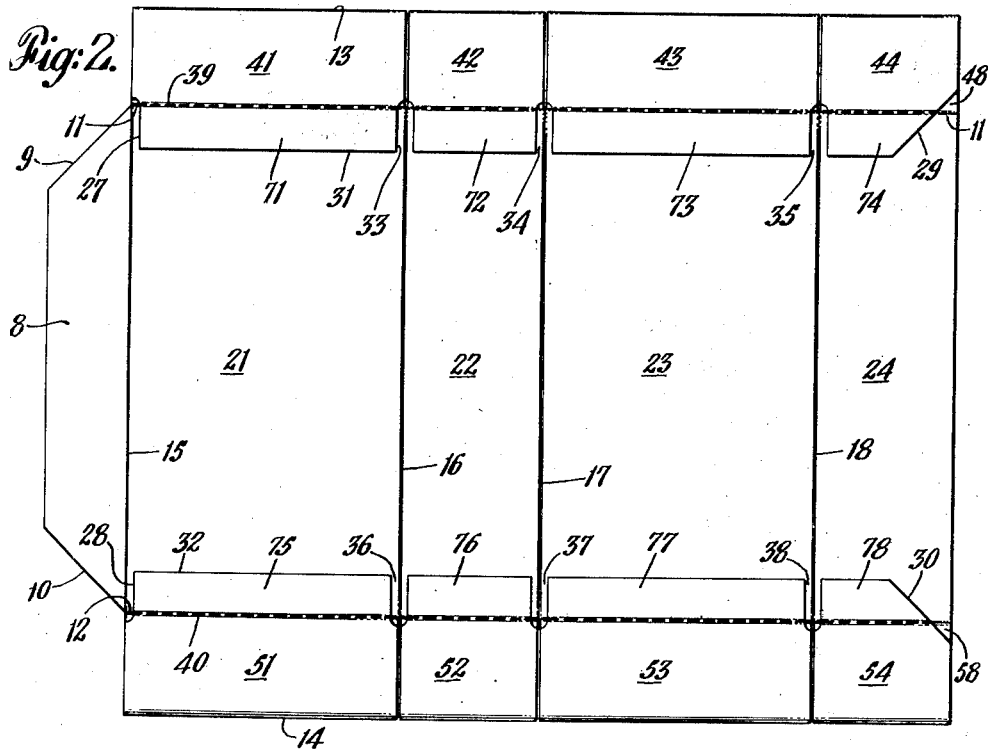
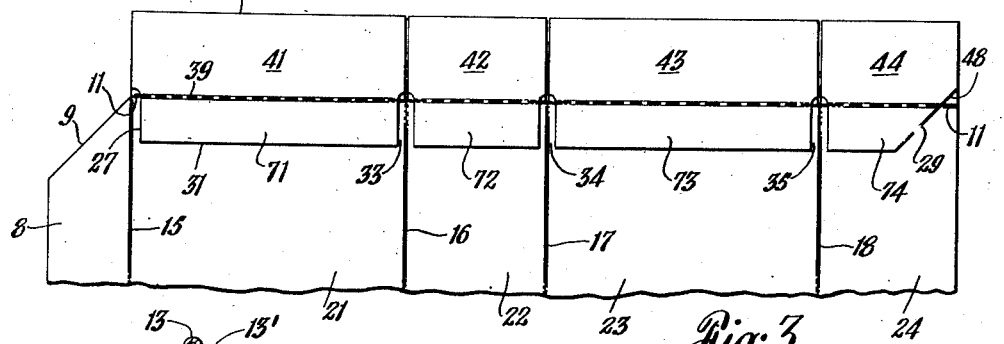
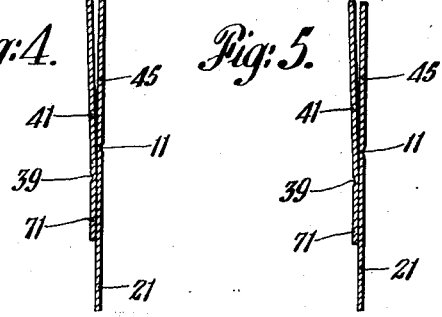
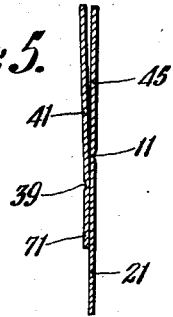
INVENTOR.
ARTHUR J. WEISS
BY Donald W. Robertson
ATTORNEY June 30, 1953     A. J. WEISS     2,643,589
METHOD OF MAKING CARTONS AND CARTON BLANKS
Original Filed Sept. 20, 1945     4 Sheets-Sheet 3
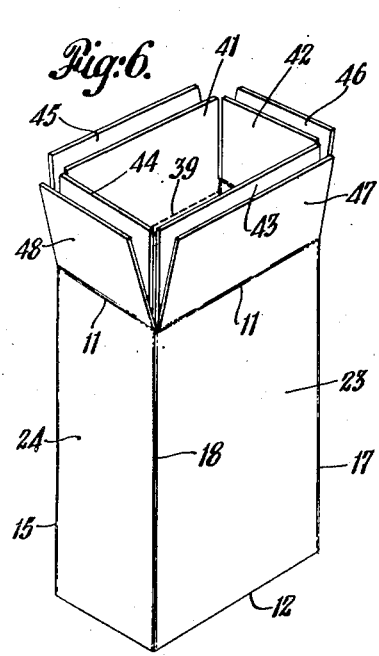
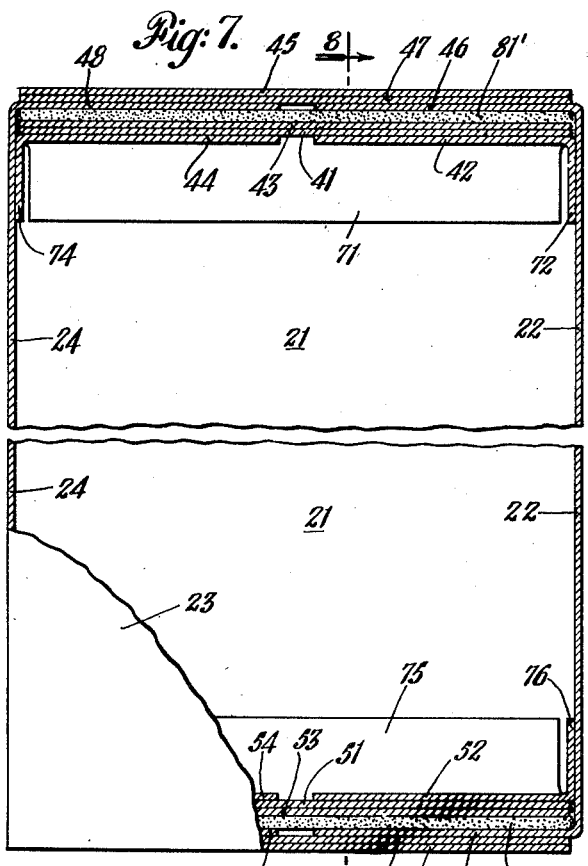
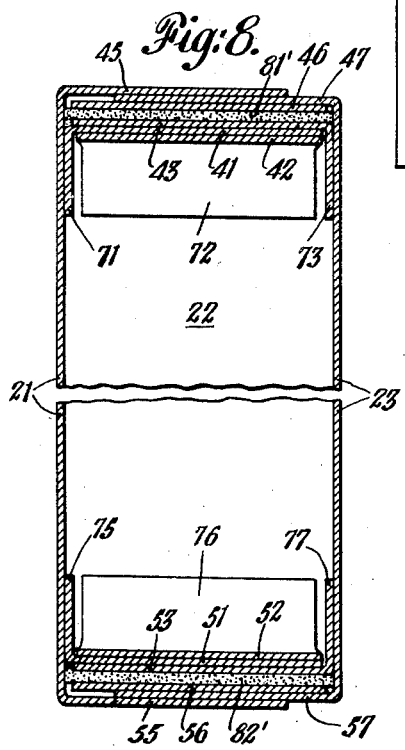
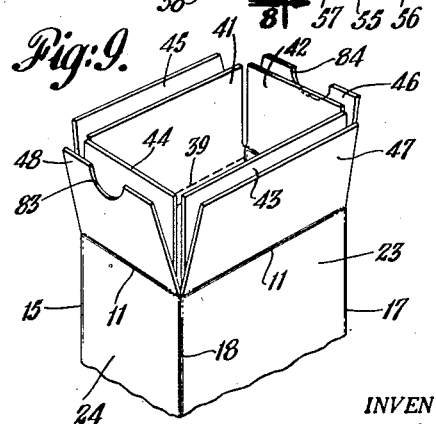
INVENTOR.
ARTHUR J. WEISS
BY
Donald W. Robertson
ATTORNEY June 30, 1953          A. J. WEISS          2,643,589
METHOD OF MAKING CARTONS AND CARTON BLANKS
Original Filed Sept. 20, 1945          4 Sheets-Sheet 4
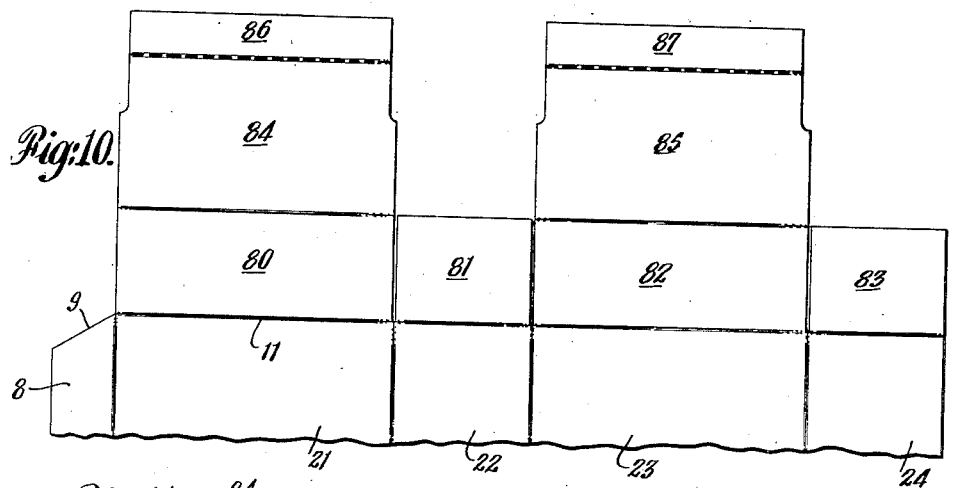
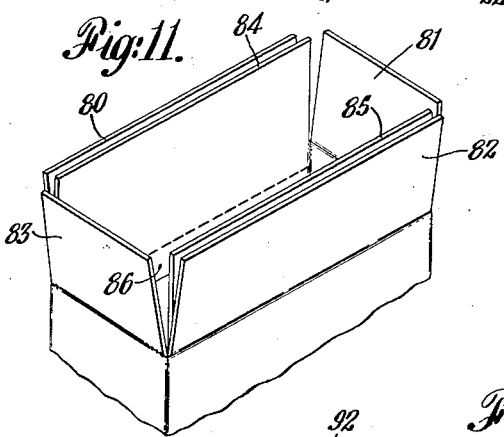
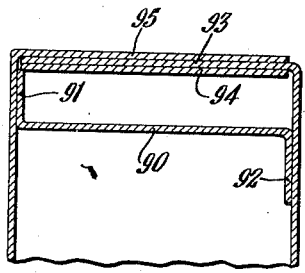
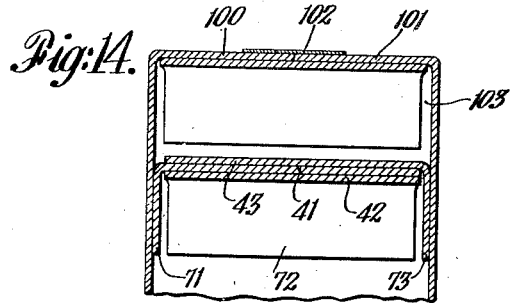
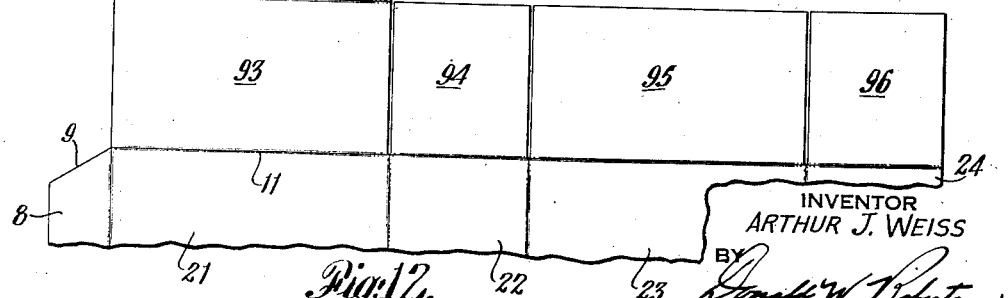
INVENTOR
ARTHUR J. WEISS
BY
ATTORNEY Patented June 30, 1953

2,643,589

UNITED STATES PATENT OFFICE 2,643,589

METHOD OF MAKING CARTONS AND CARTON BLANKS

Arthur J. Weiss, West Englewood, N. J., assignor to Robert Gair Company, Inc., New York, N. Y., a corporation of Delaware Original application September 20, 1945, Serial No. 617,530. Divided and this application September 19, 1950, Serial No. 185,682

5 Claims. (Cl. 93—36)

This invention relates to a method of making a carton or container having duplex end flaps, and of making the carton blank from which such a carton or container is formed from any suitable carton or container stock.

Where a strong, rigid end seal is desired the cartons previously available have not been entirely satisfactory. The customary type of single end closure flaps at the end of the carton do not ordinarily provide a very tight closure. They have also been generally unsatisfactory, in so far as providing a tight seal is concerned, where the containers or cartons have been used to enclose products intended to be stored in freezing units or compartments.

Moreover, the customary single end closure flaps do not provide any space therebetween at the end of the carton into which a sealing compound, such as paraffin or wax, may be introduced when an especially tight end seal is desired. It is also desirable in many cases to close off part of the interior of the carton. Such inner partitioning is possible when the carton is provided with my novel duplex end flap construction, and the individual end flaps comprising each pair are spaced from each other at the end of the carton. This is not possible with the usual single end closure flaps now used on cartons or containers of this general type.

It is therefore one of the objects of my invention to provide a new and improved method of making a container or carton which has duplex flaps at one or both ends thereof, and of making a blank from which such a carton can be formed.

It is another object of my invention to provide a new and improved method of making a container or carton, and blank therefor, which will have duplex end flaps, at either end, or at both ends thereof, and in which a space is provided between each of the two sets of duplex end flaps, which space can be filled with paraffin or other sealing material.

It is a further object of my invention to provide a method of making a container or carton with duplex end flaps at each end thereof, or, if desired at one end thereof only, which duplex end flaps are so located that a space is provided between each set thereof at one or both ends of the carton, thus making it possible to close off a portion of the interior of the carton, or to provide a partition formed by one set of end flaps across the carton at one or more points therein.

The foregoing objects of my invention, as well as others which will be apparent hereinafter, will be clear from the ensuing disclosure of certain preferred embodiments thereof.

My invention is best illustrated and described in connection with the annexed drawings wherein:

Fig. 2 is a view of the carton blank of Fig. 1, with the top and bottom side panel extension portions folded over, and secured to the side panels of the blank, preparatory to forming the duplex end flaps;

Fig. 3 is a view of the upper part of the carton blank of Fig. 2 with its folded upper edge trimmed off or severed to provide double end flaps for the carton or container;

Fig. 4 is a cross-sectional view of a folded side panel extension portion of Fig. 2 before the edge is trimmed off or severed to provide the double end flap, the attachment flap being glued or otherwise secured to the side panels;

Fig. 5 is an edge view of a folded side panel extension portion similar to Fig. 4, except that the edge portion has been trimmed off, or severed, to provide a set of free duplex end flaps;

Fig. 6 is a view of the assembled carton with its lower end flaps glued in place, but with the end flaps at the upper end opened out to show the duplex end flap construction;

Fig. 7 is a longitudinal cross-sectional view, partly in elevation, showing the completed carton with the duplex end flaps folded-over to close the carton at both ends, and with a layer of paraffin or other sealing substance between the sets of folded end flaps at each end of the carton;

Fig. 8 is a view in cross-section of the completed carton shown in Fig. 7, this view being taken at right angles to the view shown in Fig. 7, along the line 8—8 of that figure;

Fig. 9 is a view similar to Fig. 6, but showing thumb notches or semicircular cut-away portions formed in two of the outer end flaps at one end of the carton, which permit the use of machine closing means in closing and sealing the carton;

Fig. 10 is a view of a portion of a carton blank illustrating a modified construction, and Fig. 11 is a perspective view of the upper end of a carton formed from this blank;

Fig. 12 is a view of a portion of a carton blank illustrating another modified construction, and Fig. 13 is a vertical transverse sectional view of the upper end of a carton formed from this blank; and Fig. 14 is a view similar to Fig. 13 but illustrating a still further modification.

Figure 1:
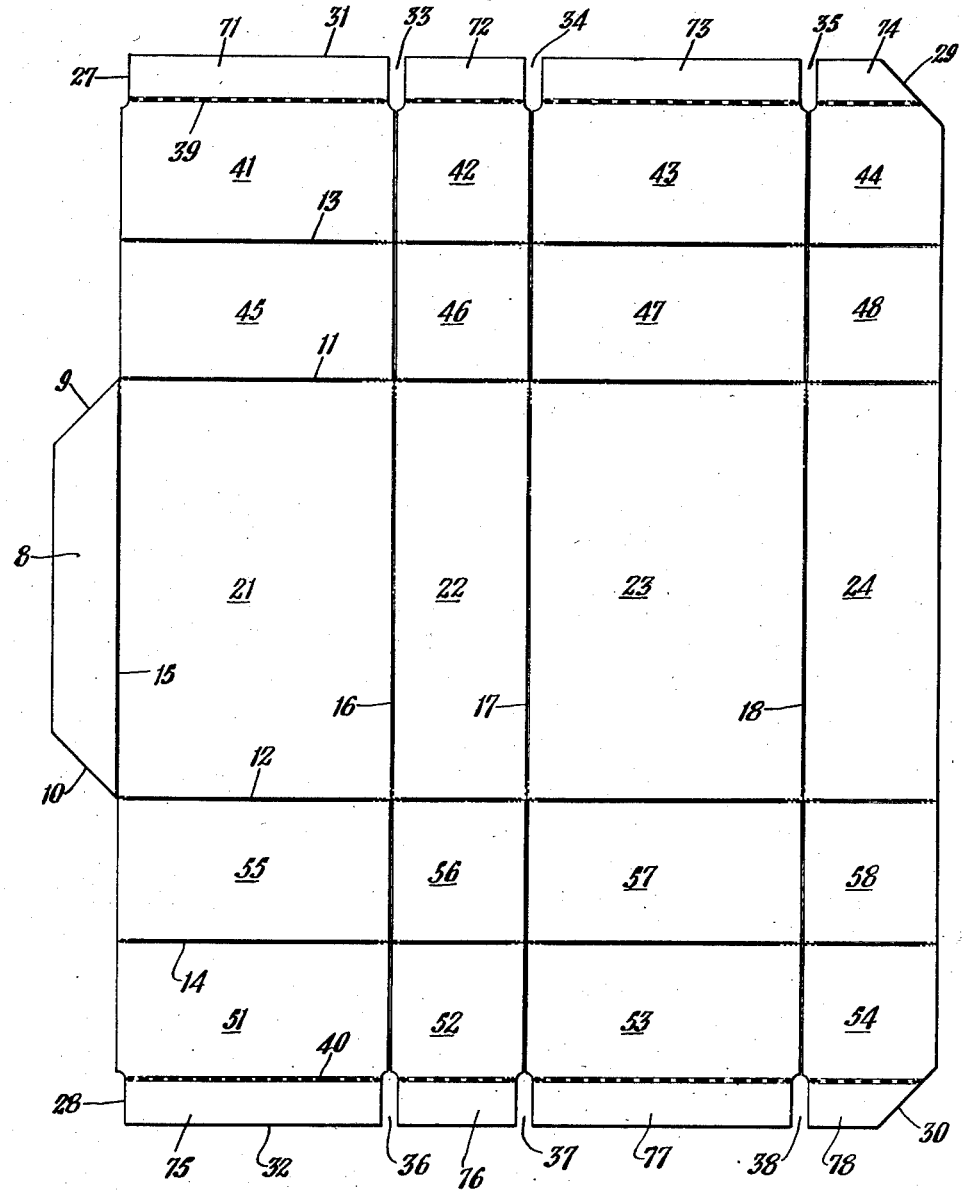
Fig. 1 is a view of the carton blank provided with fold lines, attachment flaps, and slit or cut portions, before the blank is folded over to provide the double set of flaps at each end of the carton.

In preparing my improved carton with double end flaps, and the blank from which it is formed, in accordance with my invention, a generally rectangular blank of cardboard or other suitable carton or container stock having an extended attachment tab 8 (Fig. 1) is provided. As shown, this attachment tab may be of generally trapezoidal shape, provided with oblique edges 9 and 10. The blank is adapted to be folded along the lines 11 and 12, which define the upper and lower margins of the side panels of the completed carton, and along the fold lines 13 and 14. The blank is also folded along other fold lines at right angles to fold lines 11, 12, 13, and 14, by bending or creasing the carton stock along the fold lines 15, 16, 17, and 18. In this way there are provided the four side panels 21, 22, 23, and 24, and the attachment tab 8. The distance between fold lines 11 and 13, and between fold lines 12 and 14 may be equal to, or less than the width of the narrow side panels 22 and 24.

The blank is slitted or notched at its corners 27 and 28 nearest the attachment tab 8. At its opposite corners it is cut along diagonal lines 29 and 30, so that when the carton is assembled, the trapezoidally-shaped attachment tab 8 may be glued or otherwise secured to one of the side panels without overlapping the folded end flap portions.

At the extremities of fold lines 16, 17, and 18, adjacent upper edge 31 and lower edge 32 of the blank, the blank is notched or slitted, the notch or slit extending a short distance into the blank. As shown, these notches 33, 34, 35 adjacent edge 31, and 36, 37 and 38, adjacent edge 32, extend into the blank a distance approximately equal to the depth of the corner notches 27 and 28. That portion of fold lines 16, 17, and 18, extending above the transverse fold line 11, and below the transverse fold line 12, i. e., extending between these fold lines and notches 33, 34, and 35, adjacent the upper edge 31 of the blank, and notches 36, 37, and 38, adjacent the lower edge 32 of the blank, are slit or cut as indicated in Fig. 1 so that four separate flaps are provided at each end of the blank. Indicator folds or score lines 39 and 40 are also formed, extending across the blank slightly exteriorly of the bottom portions of the notches 33, 34, 35, 36, 37, and 38, thus marking the inner edges of the attachment tabs which are to be glued or otherwise secured to the side panels 21, 22, 23, and 24. Lines 39 and 40 may be cut score lines, to facilitate bending of the stock.

The distance between score lines 39 and fold line 13 may be substantially equal to the width of the narrow side panels 22, 24. The distance between fold lines 11 and 13 may be of similar extent, or may be less. If of equal extent, the two sets of flaps will close into closely adjacent relationship. If of less extent, a compartment will be formed between the four inner flaps and the four outer flaps, as shown in Figs. 7 and 8.

The resulting carton blank is thus provided with attachment flange or tab 8, side panels 21, 22, 23, and 24, eight upper end flaps 41, 42, 43, 44, 45, 46, 47 and 48, eight lower end flaps 51, 52, 53, 54, 55, 56, 57, and 58, and securing tabs 71, 72, 73, 74, 75, 76, 77, 78. The securing tabs are adapted to be glued or otherwise secured to the side panels.

In folding my carton blank, illustrated in Fig. 1, to provide a new and improved carton or container having the duplex end flaps characteristic of my improved carton, the first step is to fold over the upper end flaps 41, 42, 43, and 44, against end flaps 45, 46, 47, and 48 along the fold line 13. The securing tabs 71, 72, 73, and 74 are then glued, or otherwise suitably secured, to the side panels 21, 22, 23, and 24 just below the fold line 11, the score line 39 coinciding with this fold line, or being parallel to this fold line and spaced somewhat below it. The lower end flaps 51, 52, 53, and 54 are similarly folded over against end flaps 55, 56, 57, and 58 along the fold line 14. Attachment tabs 75, 76, 77, and 78 are then glued, or otherwise suitably secured, to the side panels 21, 22, 23, and 24 just above the fold line 12, the score line 40 coinciding with or being closely parallel to this fold line. Fig. 2 illustrates the blank resulting at the completion of this intermediate stage in the manufacture of the carton from the carton blank. One folded portion, with the attachment tabs secured to the side panels, is shown in Figure 4.

The next step in the manufacture of the carton is to sever the folded end flaps along or adjacent the fold lines 13 and 14. This is readily accomplished by trimming away a narrow strip of material by cuts through the folded portion on both sides of the fold lines 13 and 14, as along the trimming line 13' indicated in Fig. 4. The blank resulting when this is done is illustrated, in part, in Fig. 3, and Fig. 5 shows the two free flaps of the double end flap construction resulting when a narrow strip has been trimmed off adjacent the fold 13 of Fig. 1.

The resulting carton blank includes the four side wall panels 21, 22, 23, and 24; the attachment flap 8; and four pairs of double end flaps, each pair being foldable about parallel fold lines, at each end of the side wall panels. Thus, the end flaps 41 and 45 comprise one pair of duplex end flaps, 42 and 46 another, 43 and 47 a third set, and 44 and 48 the fourth pair of end flaps at one end of the carton. Four pairs of duplex end flaps are also formed at the lower ends of the side panels, 51 and 55 constituting one pair, 52 and 56 another, 53 and 57 a third, and 54 and 58 the fourth pair.

The carton may now be assembled by folding the blank along lines 16 and 18 and securing the tab 8 to the inside of the panel 24, adhesive being first applied to the outside of tab 8. The diagonal edges 9 and 10 of the attachment tab will fit inside of the diagonally cut corners 29 and 30, so that overlapping of the duplex end flaps by the attachment tab is avoided. The result is a collapsed flat tubular blank which may be stored and shipped in collapsed condition and expanded into hollow carton form when required. The expanded carton is shown in Fig. 6, wherein the duplex end flaps at one end have been sealed together to provide a strong, tight closure, and those at the other end have been opened to show the duplex construction.

When the carton is closed and the end flaps sealed in place it is frequently desirable, especially where an airtight and moisture-tight seal is desired, to place a layer of paraffin or other sealing substance between the two groups of duplex end flaps. In Figs. 7 and 8 layers of paraffin 81' and 82' are shown at each end of the sealed carton between the sealed end flaps. In doing this one set of four end flaps, for example end flaps 41, 42, 43, and 44, attached to the side panels 21, 22, 23, and 24 by attachment tabs 71, 72, 73, and 74 are folded over in place first; the molten paraffin or other sealing material poured thereon; and the outer end flaps 45, 46, 47, and 48, hinged to the side wall panels at the fold line 11, are folded over and sealed in place with the aid of an adhesive. The bottom of the carton is similarly sealed, and the material packaged therein is held in a substantially moisture-proof as well as airtight condition. This is especially desirable in packaging food products for storage in a freezing unit, for such products must be tightly sealed in the container.

When the duplex end flaps are to be closed by machine methods, they may be formed with the notches or semi-circular cut-out portions 83 and 84, which permit the entry of machine elements effecting the closing operation.

In the modified construction illustrated in Figs. 10 and 11 there are four outer end flaps 80, 81, 82, 83 corresponding to the outer end flaps 45, 46, 47, 48 of the embodiment previously described. However, it has only two inner end flaps 84, 85 in place of the four inner end flaps 41, 42, 43, 44 of the previous embodiment. The inner end flaps 84, 85 are provided with attachment tabs 86, 87 which are secured to the inner sides of the carton in the manner which has been described with reference to Fig. 2. The severing operation is performed in the manner described with reference to Figs. 4 and 5 so that when the blank is assembled, there is formed the carton illustrated in Fig. 11 having two sets of end flaps, the inner set comprising two flaps and the outer set four flaps.

Figs. 12 and 13 illustrate a further modification in which the carton is provided with a separate compartment of appreciable depth partitioned off by one inner end flap 90 to which is appended a terminal tab 91 which is folded in order to reduce the length of the inner flap to fit the space between the side walls. The inner end flap also has an attachment tab 92 similar to those which have been described with reference to the other embodiments. The outer end flaps 93, 94, 95, 96 correspond to the outer end flaps 45, 46, 47, 48 or 80, 81, 82, 83 of the previous embodiments. The folding and severing operations also are performed as has been described with reference to assembly of the other carton forms, severing being performed at or adjacent the fold or score line 97. It will be observed that when the carton is assembled as shown in Fig. 13, the terminal tab 91 may extend up to the outer end of the box, or so that its edge lies directly underneath the outer end flaps.

Fig. 14 illustrates a carton which is similar to that described with reference to Figs. 1 to 8, with the exception that the outer end flaps 100, 101 are of such a length as to meet in the center when these flaps are closed preparatory to sealing the carton with a tab 102. This view also illustrates a somewhat larger space between the inner and outer end flaps as shown at 103. In other respects the showing of Figure 14 is directly comparable to Fig. 8.

It is obvious that various changes may be made in my invention as described without departing from the scope thereof. Thus, in a suitable case the end flaps 41, 42, 43, and 44, for example, need not be constructed of the same length as the end flaps 45, 46, 47, and 48, but may be shorter or longer as desired. The pregluing and folding of the inner end flaps preparatory to the severing of the flaps may be done on conventional automatic folding and gluing machines which apply adhesive first to the securing flaps, and then fold the blank about fold lines 13 and 14 into adhesive engagement of the flaps with the side panels. The inner end flaps may be utilized as a support for the outer end flaps, preventing curling or deflection of the outer end flaps under sealing pressure. In this case no space is provided between the two sets of flaps. Similar modification may be made in the bottom sets of duplex end flaps, 51, 52, 53, and 54, and 55, 56, 57, and 58.

The double end flaps provide a very strong and rigid structure.

The terms and expressions which I have employed are used in a descriptive and not a limiting sense, and I have no intention of excluding such equivalents of the invention described, or of portions thereof, as fall within the purview of the claims.

This application is a division of my copending abandoned application Serial No. 617,530, filed September 20, 1945.

I claim:

1. The method of forming a carton blank having duplex end flaps which comprises: preparing a carton blank having a side panel portion and, at at least one end thereof, an extension thereof extending beyond a side panel of the blank, folding said extension over on itself and securing it at its free edge portion to said side panel portion at a point spaced from the end thereof, and trimming away a narrow strip of material by cuts through the folded extension on both sides of its bent edge, thereby providing a side panel section with two free end flaps.

2. The method of forming a carton blank having duplex end flaps, which comprises: preparing a carton blank having a side panel portion and, at at least one end thereof, an extension thereof extending beyond a side panel of the blank, slitting said extension from its edge portion to a line marking the edge of the side panel portion, thereby forming a plurality of severed sections, folding over said severed sections on themselves and securing their free bottom edges to said side panel portion at a point spaced from the end thereof, and trimming away a narrow strip of material by cuts through the folded extension on both sides of its bent edge, thereby providing a side panel section with a plurality of free duplex end closure flaps attached thereto.

3. The method of forming a carton blank having duplex end flaps, which comprises: preparing a carton blank having a side panel portion, and, at at least one end thereof, an extension thereof extending beyond a side panel of the blank, dividing said extension, from its edge to a line marking the top of the side panel portion, into four severed flap portions, said severed flap portions being attached to said side panel portion, and being adapted to fold with respect thereto at a fold line marking the limit of the side panel section of the completed carton, folding over said severed flap portions on themselves, securing said severed flap portions at their free bottom edges to said side panel portion at a point spaced from the end thereof, and trimming away a narrow strip of material by cuts through the folded extension on both sides of its bent edge, thereby providing a side panel section with eight free end closure flaps secured thereto.

4. The method of forming duplex flaps on a carton panel having an extension hingedly connected thereto along a fold line, the method comprising, folding said extension back upon itself to overlie a marginal portion of said panel adjacent said fold line, securing to said panel the portion of the extension overlying said panel, and trimming away a narrow strip of material by cuts through the folded extension on both sides of its bent edge, whereby two flaps are formed on the same side of said panel.

5. The method of forming a carton blank for a carton provided with double end closure flaps at each end thereof, which comprises: providing a generally rectangular carton blank with an attachment tab at one edge thereof, forming fold lines therein for four side panels and an end closure flap section at each end of said side panel section, slitting said end closure flap sections at each end of said side panel section to provide, at each end thereof, four end closure flap sections attached to said side panel section, folding over said four end closure flap sections on themselves at each end of said side panel section, securing the free bottom edges of said folded-over end closure flap sections to said side panel section adjacent upper and lower fold lines thereof, and trimming away a narrow strip of material by cuts through the folded closure flap sections on both sides of said folded-over edge to provide eight end closure flaps at each end of said side panel section.

ARTHUR J. WEISS.

References Cited in the file of this patent

UNITED STATES PATENTS

| Number | Name | Date |
|---|---|---|
| 1,634,073 | Labombarde | June 28, 1927 |
| 1,753,461 | Gebhart | Apr. 8, 1930 |
| 2,085,465 | Hultin | June 29, 1937 |
| 2,142,131 | Inman | Jan. 3, 1939 |
| 2,365,739 | Williamson | Dec. 26, 1944 |